United States Patent
Xu et al.

(10) Patent No.: US 10,902,208 B2
(45) Date of Patent: Jan. 26, 2021

(54) PERSONALIZED INTERACTIVE SEMANTIC PARSING USING A GRAPH-TO-SEQUENCE MODEL

(71) Applicant: International Business Machines Corporation, Armonk, NY (US)

(72) Inventors: Kun Xu, Yorktown Heights, NY (US); Lingfei Wu, Yorktown Heights, NY (US); Zhiguo Wang, Yorktown Heights, NY (US); Vadim Sheinin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

(21) Appl. No.: 16/145,478

(22) Filed: Sep. 28, 2018

(65) Prior Publication Data
US 2020/0104366 A1    Apr. 2, 2020

(51) Int. Cl.
*G06F 40/30* (2020.01)
*G06N 3/04* (2006.01)
*G06F 16/33* (2019.01)
*G06F 16/901* (2019.01)
*G06F 16/2452* (2019.01)

(52) U.S. Cl.
CPC ........ *G06F 40/30* (2020.01); *G06F 16/24522* (2019.01); *G06F 16/3335* (2019.01); *G06F 16/9024* (2019.01); *G06N 3/04* (2013.01)

(58) Field of Classification Search
CPC ........... G06F 16/24522; G06F 16/9024; G06F 16/243; G06F 2207/4824; G06F 15/8053; G06F 16/9027; G06F 16/90332; G06F 40/146; G06F 40/211; G06F 40/51; G06F 8/427; G06F 40/30; G06F 40/284; G06F 40/268; G06F 40/55; G06F 16/3344; G06F 16/3329; G06F 40/205; G06F 16/322; G06F 40/40; G06F 40/151; G06F 40/289;
(Continued)

(56) References Cited

U.S. PATENT DOCUMENTS

| | | | |
|---|---|---|---|
| 5,966,686 A | 10/1999 | Heidorn et al. | |
| 9,286,524 B1 * | 3/2016 | Mei | G06K 9/6273 |

(Continued)

OTHER PUBLICATIONS

Zhang et al. "Leveraging syntactic and semantic graph kernels to extract pharmacokinetic drug-drug interactions from biomedical literature", SciSearch (R); ISSN: 1752-0509; BMC Systems Biology, vol. 10, pp. count 12, 2016.
(Continued)

*Primary Examiner* — Huyen X Vo
(74) *Attorney, Agent, or Firm* — Anthony Curro, Esq.; McGinn IP Law Group, PLLC (57) ABSTRACT

A semantic parsing method using a graph-to-sequence model, system, and computer program product include generating a syntactic graph for a sentence, generating node embeddings for each node based on other nodes the each node is connected to in the syntactic graph, generating a graph embedding over the node embeddings, performing attention-based recurrent neural network (RNN) decoding of the graph embedding and the node embeddings, and providing a logical translation of the sentence based on the decoding.

20 Claims, 8 Drawing Sheets

(58) Field of Classification Search
CPC .. G06F 40/14; G06F 16/3332; G06F 16/3334; G06F 40/20; G06F 40/216; G06F 40/56
See application file for complete search history.

(56) References Cited

U.S. PATENT DOCUMENTS

| | | | |
|---|---|---|---|
| 9,905,223 | B2 | 2/2018 | Chotimongkol et al. |
| 9,910,910 | B2 | 3/2018 | Riggs et al. |
| 2014/0163955 | A1* | 6/2014 | Ng Tari ............ G06F 17/2785 704/9 |
| 2016/0259851 | A1* | 9/2016 | Hopkins ............ G06F 17/2725 |
| 2017/0337268 | A1 | 11/2017 | Ait-Mokhtar et al. |
| 2018/0121500 | A1 | 5/2018 | Reschke et al. |
| 2018/0157642 | A1 | 6/2018 | Matskevich |
| 2018/0232662 | A1 | 8/2018 | Solomon et al. |
| 2018/0300314 | A1* | 10/2018 | Xie ..................... G06F 16/3329 |
| 2018/0300317 | A1* | 10/2018 | Bradbury ................ G06N 3/08 |
| 2019/0370389 | A1* | 12/2019 | Blouw ..................... G06F 17/27 |

OTHER PUBLICATIONS

Reddy, et al, "Transforming Dependency Structures to Logical Forms for Semantic Parsing", ILCC, School of Informatics, University of Edinburg, Google, New York; 2016 Association for Computational Linguistics.

Berant, et al. "Semantic Parsing via Paraphrasing", Proceedings of the 52$^{nd}$, Annual Meeting of the Association for Computational Linguistics; pp. 1415-1425, Baltimore, Maryland; UDS, Jun. 23-25, 2014.

* cited by examiner

FIG. 2

| Method | Jobs | Geo | ATIS |
|---|---|---|---|
| Zettlemoyer and Collins (2007) | 79.3 | 86.1 | 84.6 |
| Kwiatkowski et al. (2011) | - | 88.6 | 82.8 |
| Liang et al. (2011) | 90.7 | 87.9 | - |
| Kwiatkowski et al. (2013) | - | 89.0 | - |
| Zhao and Huang (2015) | 85.0 | 88.9 | 84.2 |
| Jia and Liang (2016) | - | 85.0 | 76.3 |
| Dong and Lapata (2016)-Seq2Seq | 87.1 | 85.0 | 84.2 |
| Dong and Lapata (2016)-Seq2Tree | 90.0 | 87.1 | 84.6 |
| Graph2Seq | 91.2 | 88.1 | 85.9 |
| w/o sentence level feature | 86.7 | 84.4 | 82.9 |
| w/o dependency feature | 89.3 | 85.8 | 83.8 |
| w/o constituency feature | 88.9 | 84.7 | 84.6 |
| BASELINE | 88.1 | 84.9 | 83.0 |

FIG. 3

| Feature | $Acc_{ori}$ | $Acc_{para}$ | Diff. |
|---|---|---|---|
| Sentence Level | 84.8 | 78.7 | -6.1 |
| Dep | 83.5 | 80.1 | -3.4 |
| Cons | 82.9 | 77.3 | -5.6 |
| Dep + Cons | 84.0 | 80.7 | -3.3 |
| Sentence Level + Dep | 85.2 | 82.3 | -2.9 |
| Sentence Level + Cons | 84.9 | 79.9 | -5.0 |
| Sentence Level + Dep + Cons | 86.0 | 83.5 | -2.5 |

PERSONALIZED INTERACTIVE SEMANTIC PARSING USING A GRAPH-TO-SEQUENCE MODEL

BACKGROUND

The present invention relates generally to a semantic parsing method using a graph-to-sequence model, and more particularly, but not by way of limitation, to a system, method, and computer program product to encode a syntactic graph and decode a logical form.

The task of semantic parsing is to translate text to its formal meaning representations, such as logical forms or structured queries. Conventional neural semantic parsers approach this problem by learning soft alignments between natural language and logical forms from (text, logic) pairs.

However, these conventional parsers follow the conventional encoder-decoder architecture that first encodes the text into a distributional representation and then decodes it to a logical form. These parsers may differ in the choice of the decoders, such as sequence or tree decoders, but they utilize the same encoder, which is essentially a sequential Long Short-Term Memory network (SeqLSTM). This encoder only extracts word order features while neglecting useful syntactic information, such as dependency parse and constituency parse.

The conventional techniques convert a text into a logical form using sequence-to-sequence models or sequence-to-tree models. However, these methods neglect rich syntactic information, such as dependency graph and constituent parse, which could complement the simple word sequence. For example, a dependency graph presents grammatical relations that hold among the words; and a constituent tree provides a phrase structure representation. Also, the sequence encoder that works on the sequential input does not naturally model this structure information.

Therefore, a graph encoder is needed to produce a representation of a graph-structured input.

SUMMARY

In an exemplary embodiment, the present invention provides a semantic parsing method using a graph-to-sequence model including generating a syntactic graph for a sentence, generating node embeddings for each node based on other nodes the each node is connected to in the syntactic graph, generating a graph embedding over the node embeddings, performing attention-based recurrent neural network (RNN) decoding of the graph embedding and the node embeddings, and providing a logical translation of the sentence based on the decoding. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
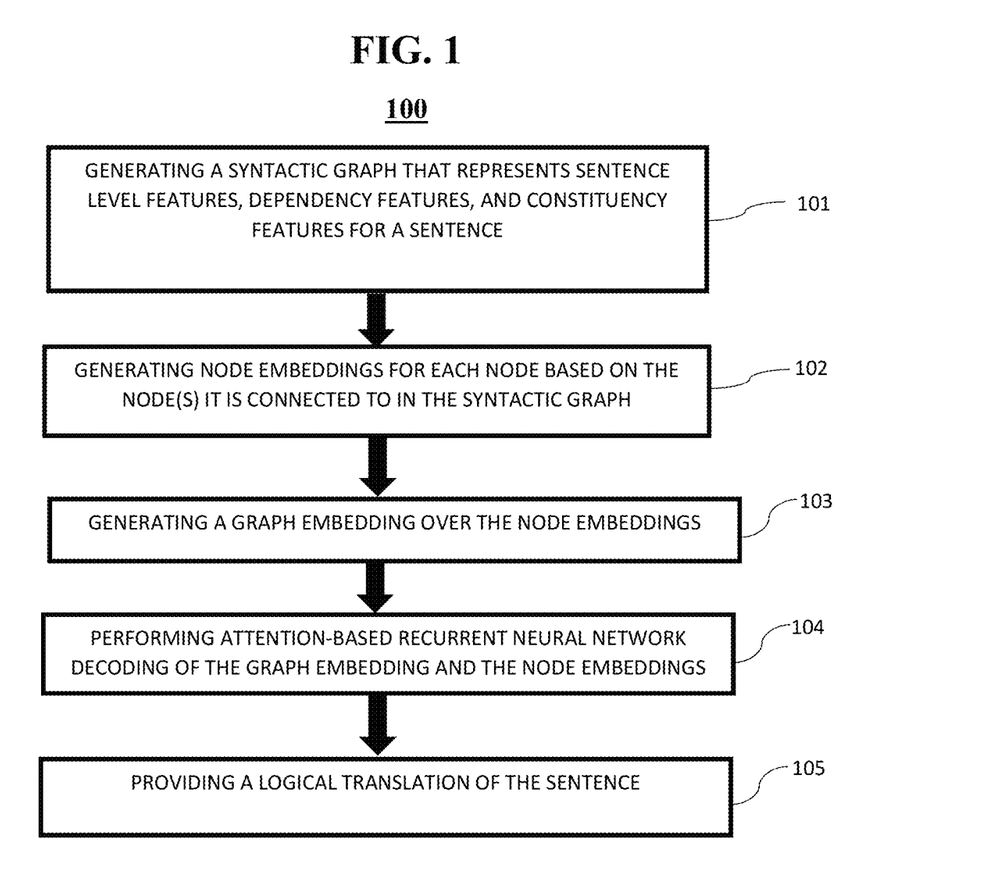
FIG. 1 exemplarily shows a high-level flow chart for a semantic parsing method 100 according to an embodiment of the present invention.

By way of introduction of the example depicted in FIG. 1, an embodiment of a semantic parsing method 100 according to the present invention can include various steps for using a graph-to-sequence model that includes of a graph encoder and a sequence decoder, to learn the representation of a syntactic graph.

Thus, the invention can learn a representation of each node in a syntactic graph by aggregating information from its K-hop neighbors (where k is an integer). Given the learned node embeddings, the graph encoder in the model uses a pooling-based method to generate the gaph embedding. On the decoder side, a Recurrent Neural Network (RNN) decoder takes the graph embedding as its initial hidden state to generate the logical form while employing an attention mechanism over the node embeddings. Therefore, more accurate logical translations of sentences than conventional techniques can be provided.

Figure 6:
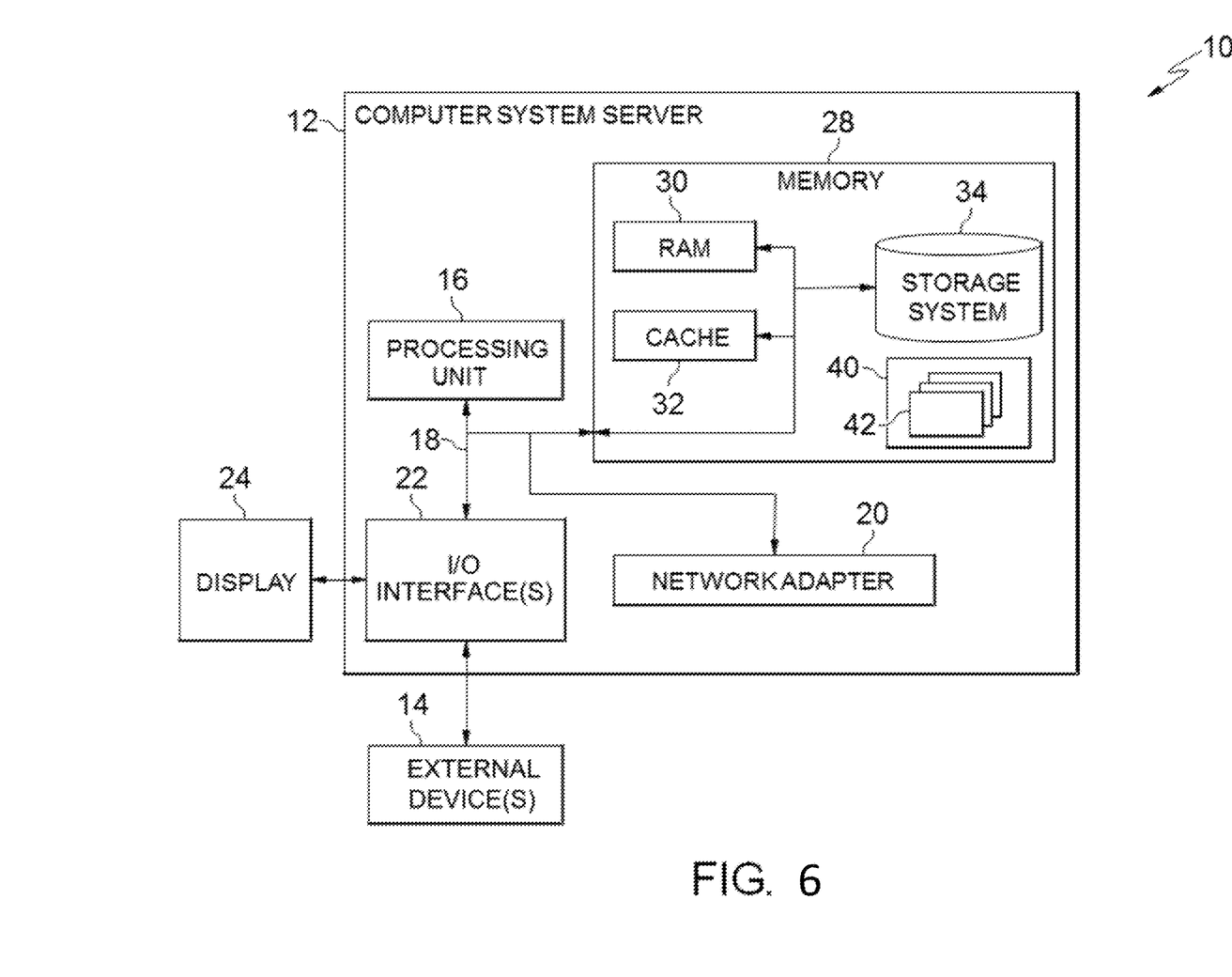
FIG. 6 depicts a cloud-computing node 10 according to an embodiment of the present invention.

By way of introduction of the example depicted in FIG. 6, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 8), it is nonetheless understood that the present invention can be implemented outside of the cloud environment.

Referring to FIG. 1, in step 101, a syntactic graph is generated that represents sentence level features, dependency features, and constituency features for a sentence.

That is, three types of syntactic features, i.e., sentence level features, dependency features and constituency features, as the syntactic graph.

Word order features (e.g., sentence level features) are used by previous neural semantic parsers by building a SeqLSTM that works on the word sequence. The syntactic graph of the invention also incorporates this information by generating a node for each word and connecting them in the chain form. In order to capture the forward and backward contextual information, these nodes are linked in two directions, that is, from left to right and from right to left.

A dependency feature describes the grammatical relations that hold among words. A dependency parse tree nay be directly transformed to a logical form, which indicates that the dependency information (i.e., tree structure and dependency labels) is critical to the semantic parsing task. The invention incorporates this information into the syntactic graph by adding directed edges between the word nodes and assigns them with dependency labels.

Similar to the dependency feature, the constituency feature represents the phrase structure, which is also important to the semantic parsing task. The constituency feature adds the non-terminal nodes of the constituent tree and the edges describing their parent-child relationships into the syntactic graph.

After building the syntactic graph for the input text (e.g., for a sentence), a graph-to-sequence model is employed in steps 102-404, which includes a graph encoder and a sequence decoder with attention mechanism, to map the syntactic graph to the logical form. As an overview, in steps 102-104, the graph encoder generates node embeddings for each node by accumulating information from its K-hop neighbors, and then produces a graph embedding for the entire graph by abstracting all these node embeddings. Next, the sequence decoder takes the graph embedding as the initial hidden state, and calculates the attention over all node embeddings on the encoder side to generate logical forms. Note that this graph encoder does not explicitly encode the edge label information. Therefore, for each labeled edge, a node is added whose text attribute is the edge's label.

That is, in step 102, node embeddings are generated for each node based on the nodes it is connected to in the syntactic graph. More specifically, given the syntactic graph G=(V, E), one takes the embedding generation process for node v∈V as an example to explain the node embedding generation algorithm 1 below.

---
Algorithm 1 Node embedding generation algorithm
---

Input: Graph $\mathcal{G}(\mathcal{V}, \varepsilon)$; node initial feature vector $a_v$, $\forall v \in \mathcal{V}$; hops K; weight matrices $W^k$ and aggregator functions $AGGREGATE_k$, $\forall k \in \{1, ..., K\}$; non-linearity $\sigma$; neighborhood function $\mathcal{N}$
Output: Vector representations $z_v$ for all $v \in \mathcal{V}$
1: $h_v^0 \leftarrow a_v$, $\forall v \in \mathcal{V}$
2: for all k = 1...K do
3:    for all $v \in \mathcal{V}$ do
4:      ▷ Aggregate information of neighbors.
5:      $h_{N(v)}^k \leftarrow AGGREGATE_k(\{h_u^{k-1}, \forall v \in N(v)\})$
6:      ▷ Generate node embedding.
7:      $h_v^k \leftarrow \sigma(W^k \cdot CONCAT(h_v^{k-1}, h_{N(v)}^k))$
8:    end for
9: end for
10: $z_v \leftarrow h_v^K$, $\forall v \in \mathcal{V}$

---

One first transforms node v's text attribute to a feature vector, $a_v$, by looking up the embedding matrix $W_e$. Then, the neighbors of v are categorized into forward neighbors $\mathcal{N}_\vdash(v)$ and backward neighbors $\mathcal{N}_\dashv(v)$ according to the edge direction. In particular, $\mathcal{N}_\vdash(v)$ returns the nodes that v directs to and $\mathcal{N}_\dashv(v)$ returns the nodes that direct to v. The forward representations of v's forward neighbors $\{h_{u\vdash}^{k-1}, \forall u \in \mathcal{N}_\vdash(v)\}$ are aggregated into a single vector, $h_{\mathcal{N}_\vdash}^k(v)$, where $k \in \{1, \ldots, K\}$ is the iteration index. Specifically, this aggregator feeds each neighbor's vector to a fully-connected neural network and applies an element-wise max-pooling operation to capture different aspects of the neighbor set. At iteration k, this aggregator only uses the representations generated at k−1. The initial forward representation of each node is its feature vector previously calculated. v's current forward representation $h_{v\vdash}^{k-1}$ is concentrated with the newly generated neighborhood vector $h_{\mathcal{N}_\vdash}^k(v)$. The resulted vector is fed into a fully connected layer with nonlinear activation function σ, which updates the forward representation of v, $h_{v\vdash}^k$, to be used at the next iteration. One then updates the backward representation of v, $h_{v\dashv}^k$ using the similar procedure previous except that operating on the backward representations. This is repeated K times (where k is an integer), and the concentration of the final forward and backward representations is used as the final representation of v. Since the neighbor information from different hops may have different impacts on the node embedding, one learns a distinct aggregator at each iteration.

In other words, in step 102, the representations for all nodes are calculated by aggregating their immediate neighbor's information. This is repeated K times to propagate the information of neighbor nodes within K hops to each node.

In step 103, a graph embedding is generated over the node embeddings. The graph embedding can be generated by performing max-pooling over the node embeddings or by creating an additional node and performing node embedding for the additional node as though it is connected to all other nodes of the graph.

In step 104, attention-based recurrent neural network (RNN) decoding is performed of the graph embedding and the node embeddings.

That is, the decoder is an RNN which predicts the next token $y_i$ given all the previous words $y<i=y_1, \ldots, y_{i-1}$, the RNN hidden state $s_1$ for time-step i and the context vector $c_i$ that captures the attention of the encoder side. In particular, the context vector ci depends on a set of node representations ($h_I, \ldots, h_V$) to which the encoder maps the input graph. The context vector $c_i$ is dynamically computed using an attention mechanism over the node representations. The whole model is jointly trained to maximize the conditional log-probability of the correct description given a source graph. In the inference phase, one uses the beam search algorithm to generate a description with beam size=3.

In other words, the decoder takes the graph embedding and node embeddings as input and the decoder calculates a context vector to capture the attention of the encoder side. The decoder s essentially an RNN decoder, which predicts the next token given all the previous words.

In step 105, a logical translation of the sentence is provided based on the decoding. That is, step 105 includes interaction with a human, user, Artificial intelligence (AI) service/agent, etc. Step 105 provides the input text along with the generated logical form to the user and allows the users to give feedback and check if the produced natural language description is correct. If the logical translation is incorrect, then the method loops back to step 102 and performs the method again to learn from the error.

Figure 4:
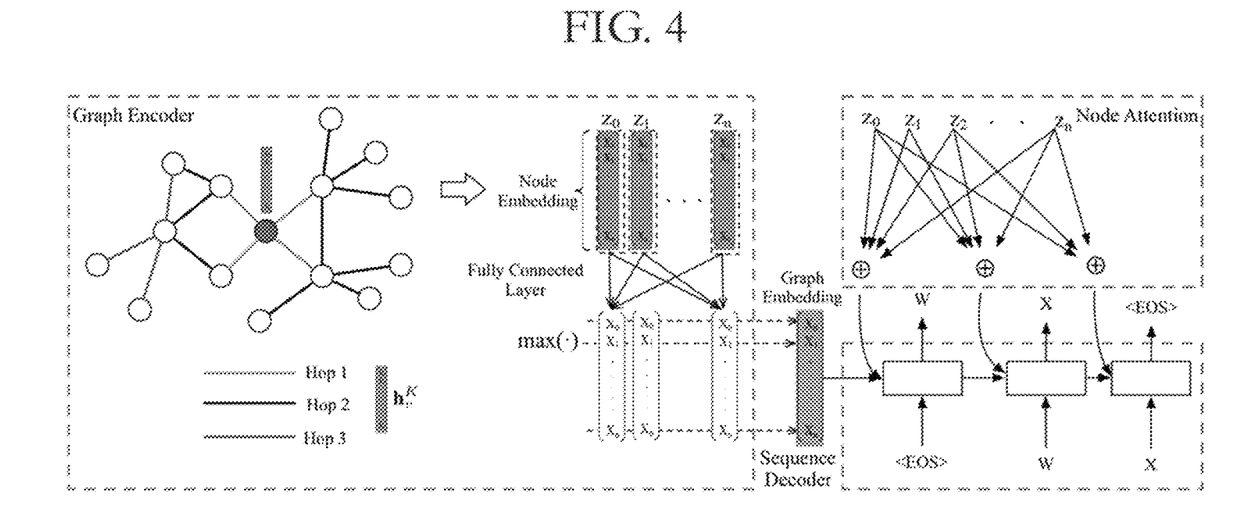
FIG. 4 depicts a graph-to-sequence model according to an embodiment of the present invention.
Figure 5:
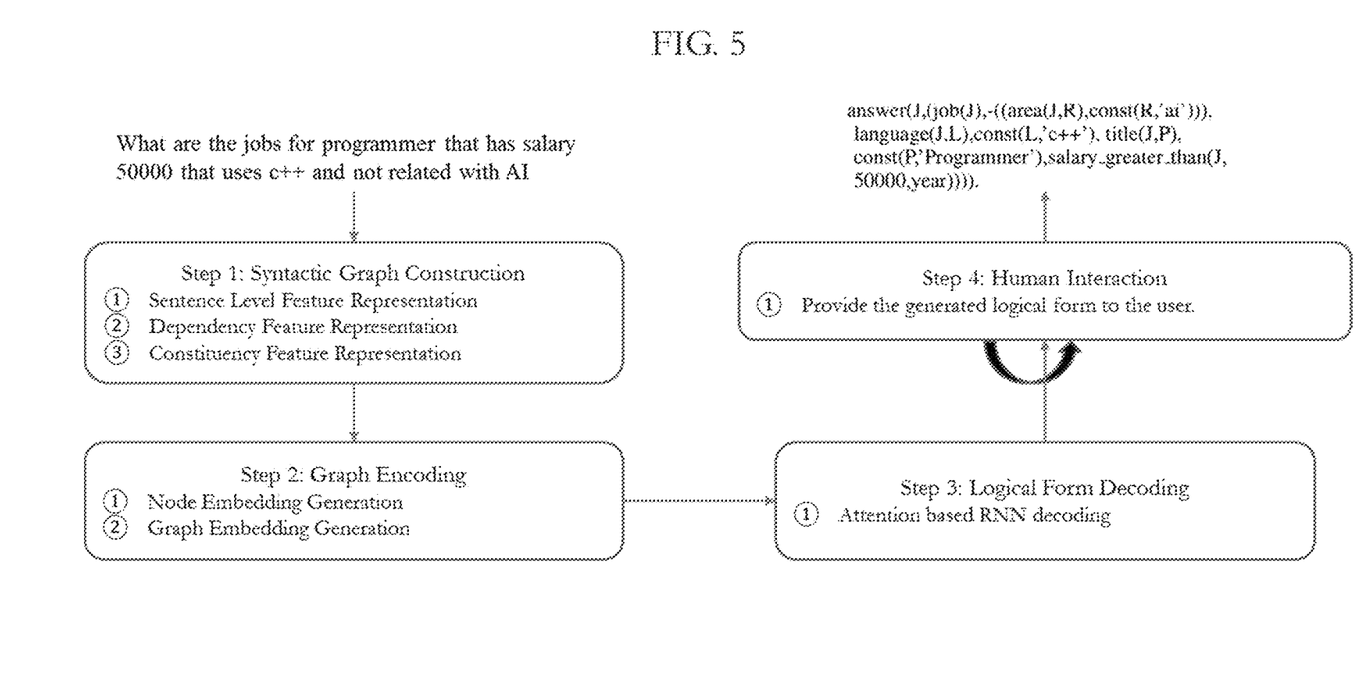
FIG. 5 depicts an exemplary use case of the method 100.

With reference to FIG. 4, FIG. 4 exemplarily depicts the graph-to-sequence model utilized by the method 100. And, FIG. 5 exemplarily depicts a use case of the method 100 where the input to the method 100 is the question "What are the jobs for programmer that has salary 50,000 that uses c++ and not related with AI" and the sequence output is "answer (J,(job(J),-((area(J,R),const(R,'ai'))),language(J,L),const(L, 'c++'),title(J,P),const(P,'Programmer'),salary greater than(J, 50000,year))))".

Figure 2:
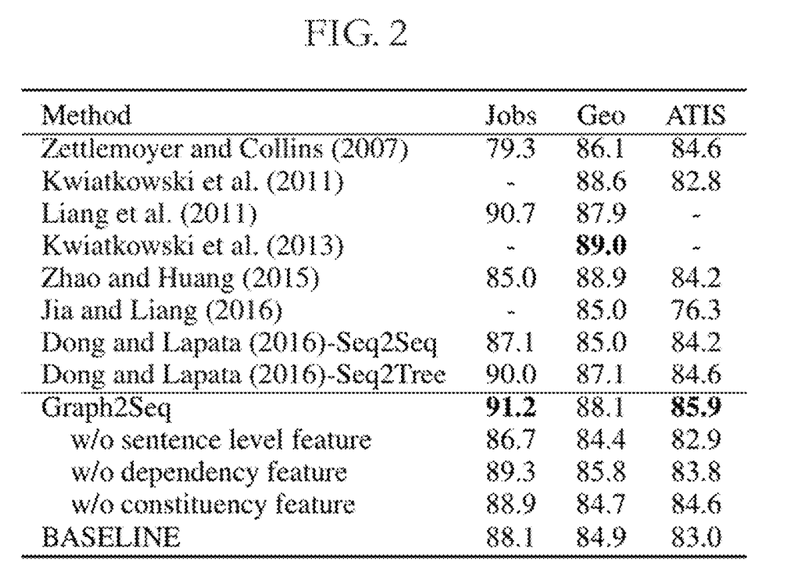
FIG. 2 depicts an exact-match accuracy on Jobs640, Geo880 and Automatic Terminal Information Service (ATIS) of the method 100.

Referring to FIG. 2, in a practical example, the model is evaluated based on three datasets: Jobs640, a set of 640 queries to a database of job listings; Geo880, a set of 880 queries to a database of U.S. geography; and ATIS, a set of 5,410 queries to a flight booking system. The standard train/development/test split is used as previous works, and the logical form accuracy as the evaluation metric. FIG. 2 summarizes the results of the Graph2Seq model and existing semantic parsers on three datasets. The inventive model achieves competitive performance on Jobs640, ATIS and Geo880. The work is the first to use both multiple trees and the word sequence for semantic parsing, and it outperforms the Seq2Seq model, which only uses limited syntactic information.

Figure 3:
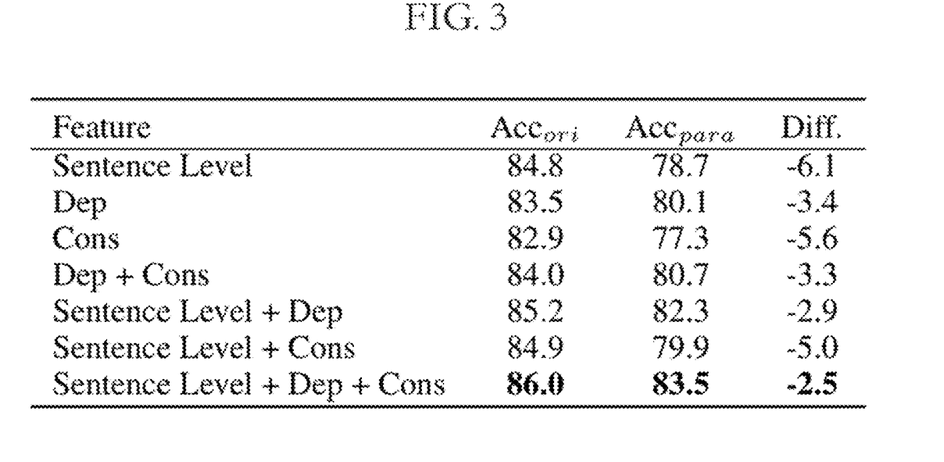
FIG. 3 depicts an evaluation result on ATIS of the method 100.

Also, referring to FIG. 3, FIG. 3 shows the results of the model tested on a type of adversarial examples. FIG. 3 shows that no matter which feature the model uses, the performance degrades at least 2.5% on the paraphrased dataset, that the model that only uses word order features (e.g., "sentence level") achieves the worst robustness to the paraphrased queries while the dependency feature seems more robust than the other two features, and that simultaneously utilizing three syntactic features greatly enhance the robustness of the model.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 6, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 1. Such communication can occur via Input/Output (I/O) interface 22, and/or any circuits (e.g., network card, modem, etc.) that enable computer system server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 7:
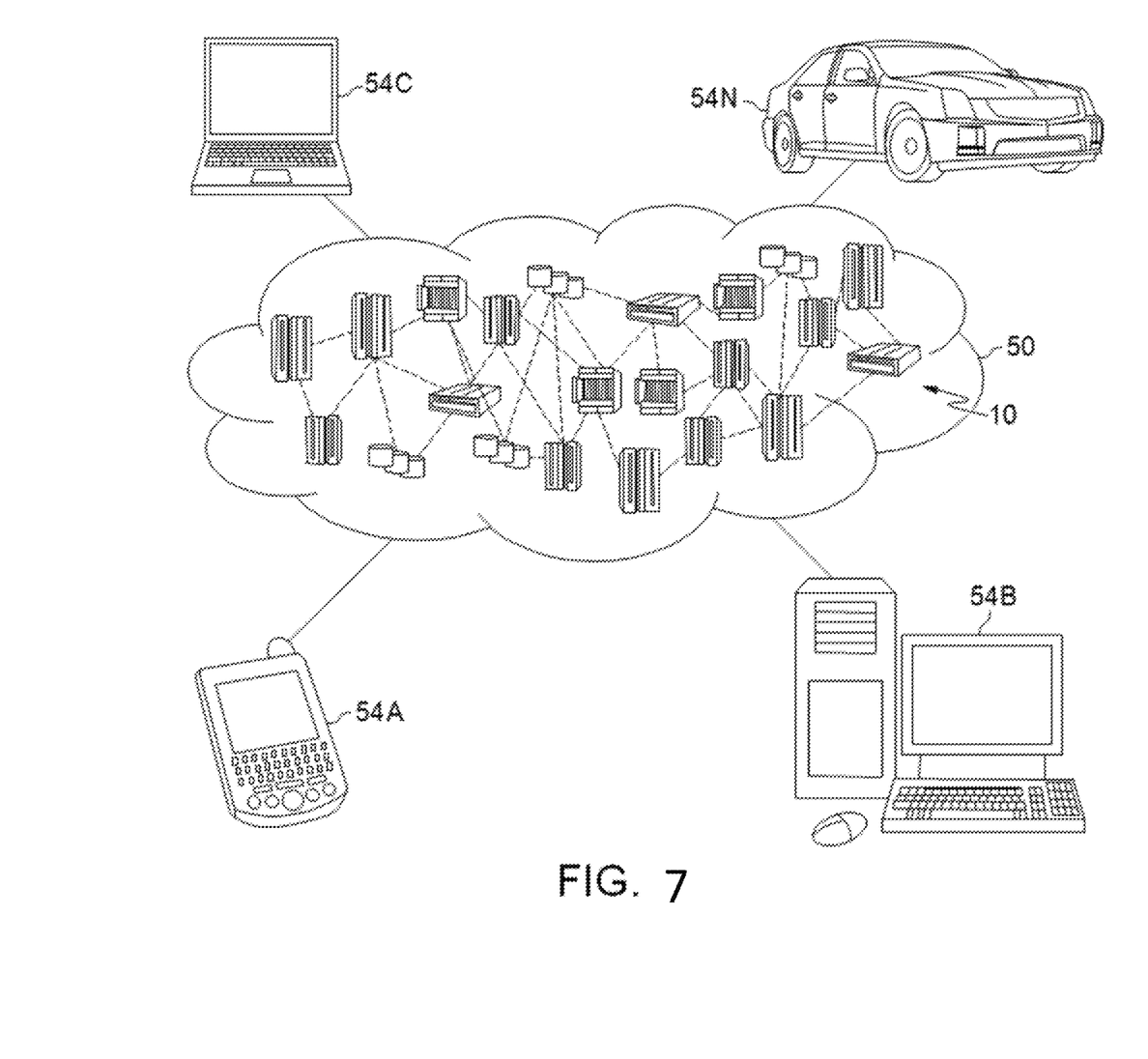
FIG. 7 depicts a cloud-computing environment 50 according to an embodiment of the present invention.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Figure 8:
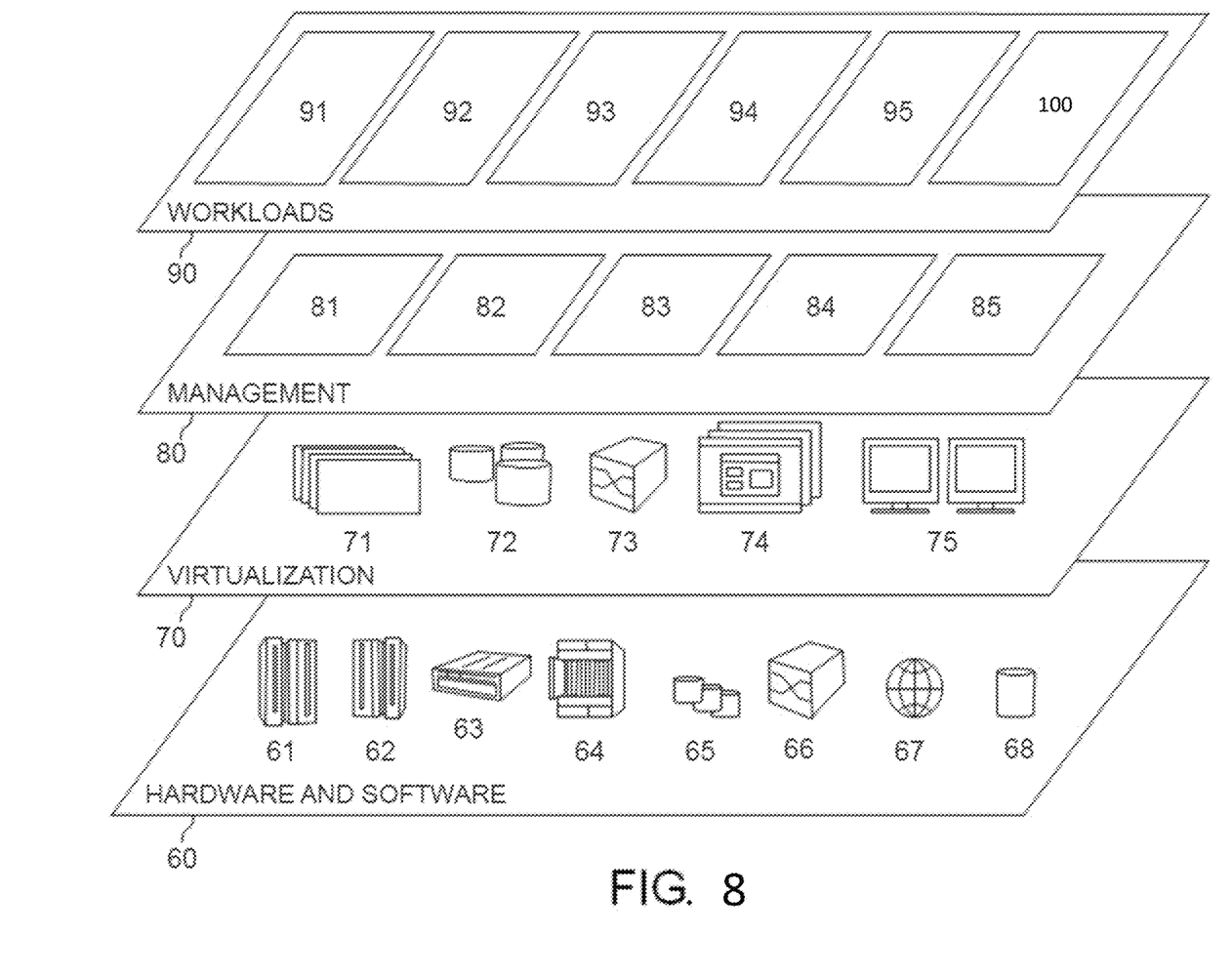
FIG. 8 depicts abstraction model layers according to an embodiment of the present invention.

Referring now to FIG. 8, an exemplary set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below,. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and semantic parsing method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), in some embodiments, electronic circuitry including, for example, programmable logic circuitry, meld-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented semantic parsing method using a graph-to-sequence model, the method comprising:
   generating a syntactic graph for a sentence by generating a node for each word and connecting the node of each word in the chain form, the chain form connection enabling linking of the nodes in two directions;
   generating node embeddings for each node based on other nodes the each node is connected to in the syntactic graph;
   generating a graph embedding over the node embeddings;
   performing an attention-based recurrent neural network (RNN) decoding of the graph embedding and the node embeddings; and
   providing a logical translation of the sentence based on the decoding,
   wherein the syntactic graph comprises a dependency graph and a constituent parse, and
   wherein the syntactic graph includes a model to learn a mapping between text and logic form in natural language processing.

2. The computer-implemented method of claim 1, wherein the generating the graph embedding generates the graph embedding by performing max-pooling over the node embeddings,
   wherein the model is jointly trained to maximize a conditional log-probability of a correct description given a source graph, and
   wherein the syntactic graph does not rely on any rules and instead learns a mapping of the graph from natural language and logical forms.

3. The computer-implemented method of claim 1, wherein the generating the graph embedding generates the graph embedding by creating an additional node and performing node embedding for the additional node as though the additional node is connected to all other nodes of the syntactic graph.

4. The computer-implemented method of claim 1, further comprising querying a user to determine an error for the logical translation of the sentence.

5. The computer-implemented method of claim 4, wherein, if the user returns the error for the logical translation of the sentence, repeating the generating the node embeddings, the generating the graph embedding, and the performing the attention-based recurrent neural network (RNN) decoding to produce a second logical translation.

6. The computer-implemented method of claim 1, wherein the performing the attention-based recurrent neural network (RNN) decoding calculates a context vector to capture an attention of the generating the node embeddings and the generating the graph embedding.

7. The computer-implemented method of claim 1, wherein the syntactic graph represents sentence level features, dependency features, and constituency features.

8. The computer-implemented method of claim 1, embodied in a cloud-computing environment.

9. A computer program product for semantic parsing using a graph-to-sequence model, the computer program product comprising a non-transitory computer-readable storage medium having program instructions embodied therewith, the program instructions executable by a computer to cause the computer to perform:
   generating a syntactic graph for a sentence by generating a node for each word and connecting the node of each word in the chain form, the chain form connection enabling linking of the nodes in two directions;
   generating node embeddings for each node based on other nodes the each node is connected to in the syntactic graph;
   generating a graph embedding over the node embeddings;
   performing an attention-based recurrent neural network (RNN) decoding of the graph embedding and the node embeddings; and
   providing a logical translation of the sentence based on the decoding,
   wherein the syntactic graph comprises a dependency graph and a constituent parse, and
   wherein the syntactic graph includes a model to learn a mapping between text and logic form in natural language processing.

10. The computer program product of claim 9, wherein the generating the graph embedding generates the graph embedding by performing max-pooling over the node embeddings.

11. The computer program product of claim 9, wherein the generating the graph embedding generates the graph embedding by creating an additional node and performing node embedding for the additional node as though the additional node is connected to all other nodes of the syntactic graph.

12. The computer program product of claim 9, further comprising querying a user to determine an error for the logical translation of the sentence.

13. The computer program product of claim 12, wherein, if the user returns the error for the logical translation of the sentence, repeating the generating the node embeddings, the generating the graph embedding, and the performing the attention-based recurrent neural network (RNN) decoding to produce a second logical translation.

14. The computer program product of claim 9, wherein the performing the attention-based recurrent neural network (RNN) decoding calculates a context vector to capture an attention of the generating the node embeddings and the generating the graph embedding.

15. The computer program product of claim 9, wherein the syntactic graph represents sentence level features, dependency features, and constituency features.

16. A semantic parsing system using a graph-to-sequence model, the system comprising:
    a processor; and
    a memory, the memory storing instructions to cause the processor to perform:
        generating a syntactic graph for a sentence by generating a node for each word and connecting the node of each word in the chain form, the chain form connection enabling linking of the nodes in two directions;
        generating node embeddings for each node based on other nodes the each node is connected to in the syntactic graph;
        generating a graph embedding over the node embeddings;
        performing attention-based recurrent neural network (RNN) decoding of the graph embedding and the node embeddings; and
        providing a logical translation of the sentence based on the decoding,
    wherein the syntactic graph comprises a dependency graph and a constituent parse, and
    wherein the syntactic graph includes a model to learn a mapping between text and logic form in natural language processing.

17. The system of claim 16, wherein the generating the graph embedding generates the graph embedding by performing max-pooling over the node embeddings.

18. The system of claim 16, wherein the generating the graph embedding generates the graph embedding by creating an additional node and performing node embedding for the additional node as though the additional node is connected to all other nodes of the syntactic graph.

19. The system of claim 16, wherein the syntactic graph represents sentence level features, dependency features, and constituency features.

20. The system of claim 14, embodied in a cloud-computing environment.

* * * * *